United States Patent [19]

Vassiliades et al.

[11] 4,075,389

[45] Feb. 21, 1978

[54] OPAQUE MICROCAPSULAR RELEASE SHEET

[75] Inventors: Anthony E. Vassiliades, Deerfield; David N. Vincent, Glenview, both of Ill.

[73] Assignee: Champion International Corporation, Stamford, Conn.

[21] Appl. No.: 230,088

[22] Filed: Feb. 28, 1972

[51] Int. Cl.² .................... B01J 13/02; C09D 5/00; B44D 1/02

[52] U.S. Cl. .................................. 428/306; 428/42; 428/447; 428/501; 428/513; 428/530

[58] Field of Search .............. 117/100 A, 68.5, 122 P, 117/122 PF, 161 ZA; 260/46.5 R, 2.5 AH; 428/42, 306, 447, 501, 513, 530

[56] References Cited

U.S. PATENT DOCUMENTS

| | | | |
|---|---|---|---|
| 2,599,576 | 6/1952 | Morris et al. | 117/68.5 |
| 2,993,871 | 7/1961 | Shannon et al. | 260/46.5 X |
| 3,418,250 | 12/1968 | Vassiliades | 117/100 X |
| 3,418,656 | 12/1968 | Vassiliades | 117/100 X |
| 3,432,333 | 3/1969 | Hurst | 117/68.5 X |
| 3,548,025 | 12/1970 | Koerner | 117/161 X |
| 3,556,835 | 1/1971 | Sorell | 117/68.5 |
| 3,585,149 | 6/1971 | Vassiliades et al. | 117/148 X |
| 3,669,899 | 6/1972 | Vassiliades et al. | 117/100 X |

*Primary Examiner*—Bernard D. Pianalto
*Attorney, Agent, or Firm*—Roylance, Abrams, Berdo & Kaul

[57] ABSTRACT

Opaque release sheet comprising a base having a coating comprising a primary release agent in the form of air-containing microcapsular opacifiers which may be used in combination with a minor amount of a secondary release agent, such as silicone-poly-glycol copolymer, a methoxysilane, polyethylene, a metal complex or the like, provide opaque, lightweight, dimensionally stable release sheets.

22 Claims, No Drawings

OPAQUE MICROCAPSULAR RELEASE SHEET

This invention relates to a microcapsular release system for use in conjunction with pressure sensitive adhesives. More particularly, this invention relates to an opaque release coating sheet comprising air-containing microcapsules.

The advent of pressure-sensitive adhesives, which adhesives are normally tacky and adhere upon the application of a relatively light pressure, and wide commercial employment of such adhesives has created an equally wide and divergent market for release papers. Thus, labels, tape, decals and the like are provided with a pressure-sensitive adhesive and utilize a release paper, which can be peeled off and discarded in order to expose the tacky, pressure-sensitive surface and thereby permit the application of the label, tape or the like to the desired surface. Thus, "release paper" constitutes a substrate upon which tacky materials may be applied and removed with varying degrees of ease without affecting the properties of the materials or the release coating itself.

Accordingly, pressure-sensitive labels may be applied to a release paper and held in place until a subsequent time at which the labels are peeled from the release paper and may be adhesively applied to another surface. Likewise, adhesive tape is normally provided with a tacky adhesive coating on one surface thereof, while the opposite surface is provided with a release coating. In this manner, the adhesive tape can be unwound easily without destroying the adhesive properties of the tape or affecting the release surface. In addition, release bakery papers find use in the processing and packaging of foods, such as candy or bakery products, the packing of certain polymers or chemicals, as a support for cast liquid resins which are subsequently gelled, and in general applications where it is desired to temporarily shield a tacky material.

Various release agents have been proposed including wax, soaps and other surface active agents, Werner chrome complexes of stearic acid, fluorocarbon polymers, various silicone polymers and the like.

Different applications and processing for tapes and labels require diverse pressure-sensitive adhesive properties and formulations and thus, it is necessary to provide release papers with varying release properties. Many of the previously proposed release agents are suitable for certain pressure-sensitive adhesives, but not for others, thereby making the selection of a proper release agent difficult. Furthermore, in some instances it is desirable to provide a release paper having release properties on one surface which differ from those on the opposite surface of the same paper. For example, if an adhesive material or the like is to be rolled up within the release paper, it is necessary that one side of the release paper releases easily when the adhesive tape is unrolled, while the other surface, which is to remain in place on the adhesive until later application, remains bonded to the pressure-sensitive adhesive surface until it is desired to remove the release paper. Release agents such as the silicones have been unsuitable for such usage.

In addition, prior release agents are relatively expensive and a rather large amount of release material has been required in the production of release papers therefrom. Moreover, many prior release papers have been made from rather unsightly, inexpensive brown paper and have very little aesthetic value. It would be highly desirable to provide inexpensive release papers that are highly opaque or white.

Still another difficulty with many of the prior release agents is that they are generally coated onto a substrate from an organic solvent base thereby providing problems with solvent recovery, fire hazards and the usual problems connected with organic solvents. Thus, it would be highly desirable to provide a release composition which could be coated from an aqueous solution thereby obviating the problems normally encountered with organic solvents.

A further problem with prior release papers is that such papers have not been dimensionally stable. Thus, various difficulties have been experienced including curl problems.

Accordingly, it is an object of the present invention to provide an improved release sheet suitable for pressure-sensitive adhesives.

Another object of the present invention is to provide a release sheet having a highly opaque surface and with release properties that are easily controllable.

A still further object of the present invention is to provide a release coating composition which may be coated from an aqueous solution thereby avoiding the problems normally encountered with organic solvents.

Another object of the present invention is to provide a relatively inexpensive release sheet that is light in weight and which is dimensionally stable.

Another object of the present invention is to provide a method for production of a highly opaque release sheet having the foregoing properties.

Still other objects of the invention will be apparent to those skilled in the art from the present disclosure.

In accordance with the present invention, an opaque, release sheet suitable for pressure-sensitive adhesives is provided which comprises a substrate having at least one surface provided with a release composition, said release composition comprising substantially spherical, air-containing microcapsules as a primary release agent. In addition, a relatively minor amount of a secondary release agent may be included in the release composition to provide a release coating having release properties similar to that ordinarily obtained when much larger amounts of conventional release agents are employed.

Surprisingly, it has been discovered that a coating composition comprising a major amount of air-containing microcapsules as the primary release agent and a relatively minor amount of a secondary release agent, such as a silicone, a methoxysilane, a stearato chromic chloride, polyethylene, and the like, provides a release paper having easily controllable release properties. Since the air-containing microcapsules are opacifying agents as well as release agents, the present release paper can be made from rather inexpensive substrates, such as unbleached kraft paper and still provide a release paper having an exceptionally high opacity and whiteness. If desired, various colors can be imparted to the paper by simply staining the walls of the microcapsular moiety with suitable dyes.

As will be hereinafter demonstrated, the air-containing microcapsules co-act with a second release agent (herein referred to as "secondary release agents") to provide a release surface having properties normally requiring much larger amounts of the secondary release agent. For example, the air-containing microcapsules may be provided with as little as 2 percent of the normal amount of silicone that would be required to provide a release surface having the properties of a 1 pound per ream silicone coating.

The term "secondary release agent" as employed in the present application is intended to include release materials other than air-containing microcapsules, including polyethylene, stearato chromic halides and other Werner chrome or aluminum complexes of stearic acid, fatty acids, fluorocarbons, silicones, and other conventional release agents.

A preferred class of the secondary release agents are the water soluble, complex compounds of the Werner type in which a trivalent, nuclear chromium or aluminum atom is coordinated with stearato groups. Such chromium compounds are commercially available a a dark green alcoholic solution ("Quilon"). The preparation and structure of these compounds is disclosed in U.S. Pat. No. 2,273,040, which is hereby incorporated by reference. Although a chromium salt of stearic acid is preferred, such salt of any cyclic carboxylic acid having at least ten carbon atoms, may be employed, e.g., chromium laurate, chromium oleate, chromium palmitate, or the like. The corresponding aluminum complex compounds are commercially available as clear, colorless solutions, for example, from DuPont (Aluminum Complex 101).

Other preferred classes of secondary release agents include the fluid silicone-polyglycol copolymers, poly(organosiloxanes), and organosilanes, such as the methoxysilanes of formula $RCH_2CH_2CH_2Si(OCH_3)_3$ wherein R represents an alkyl group, an aryl group, a halide group, a methylene diamine group, an alkyloxy group, an epoxy group, and the like. Representative methoxysilanes include

$H_2N(CH_2)_2HN(CH_2)_3Si(OCH_3)_3$

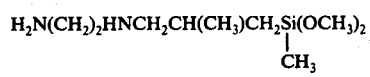

$H_2N(CH_2)_2HNCH_2CH(CH_3)CH_2Si(OCH_3)_2$
$\phantom{H_2N(CH_2)_2HNCH_2CH(CH_3)CH_2Si(O}|$
$\phantom{H_2N(CH_2)_2HNCH_2CH(CH_3)CH_2Si(OC}CH_3$

$CH_2=C(CH_3)COO(CH_2)_3Si(OCH_3)_3$

$\phantom{CH_2}O$
$\phantom{C}/\ \backslash$
$CH_2CHCH_2O(CH_2)_3Si(OCH_3)_3$

$Cl(CH_2)_3Si(OCH_3)_3$

$CH_3OOCCH_2CH_2NH(CH_2)_2NH(CH_2)_3Si(OCH_3)_3$ and the like.

Other suitable methoxy silanes include those methoxy silanes, for example of the formula $RSi(OCH_3)_3$ wherein R represents an alkyl group or an aryl group. Representative compounds of this type include, for example $CH_3Si(OCH_3)_3$ and $C_6H_5Si(OCH_3)_3$.

Another suitable silane is one having the formula $CH_2=CHSi(OOCCH_3)_3$.

The foregoing silanes and methoxysilanes may be prepared in any suitable manner. These compounds are conventional coupling agents, i.e. each molecule possesses two different kinds of reactivity. However, such compounds are not conventional release agents, and have not been heretofore used in release coatings.

Silicone resins, such as those described in U.S. Pat. No. 2,258,220 and U.S. Pat. No. 2,258,222 have been employed in release coating compositions in organic solvents, e.g., xylene, and have been used in amounts of about one pound per ream of paper (on a dry basis) to provide the desired release properties. However, according to the present invention, the secondary release agent, such as the aforesaid methoxysilanes, employed in combination with the primary release agent, viz. the air-containing microcapsules, at about a fraction of the amount previously employed with conventional silicone resin release agents.

Furthermore, organosilicon polymers of the present invention are less costly and do not require the extended curing cycles required by the conventional silicone release agents. Additionally, the release coatings of the present invention are aqueous, and thus avoid the problems ordinarily encountered with the use of organic solvents.

Although it is not intended to limit the present invention to any particular theory or mechanism, it is believed that the air-containing microcapsular release agents co-act with the secondary release agents and, perhaps through chemical interaction provide a release composition having release properties which are superior to those which could be obtained by employing either the primary or secondary release agent, alone, in the amounts utilized.

Any suitable substrate may be coated with the present release coating composition in order to provide the release papers of the present invention. Such substrates include paper, plastic films, including polyethylene film, and the like, textile fabrics including natural fabrics, such as cotton and the like, and synthetic fabrics including nylon, glass fabric, etc. Such substrates may either be flexible or non-flexible.

The release coating composition of the present invention may be applied to the particular substrate in amounts which may be varied over a wide range, depending upon the properties desired in the ultimate product. The release properties are dependent upon the coating surface rather than the thickness of the coating, as long as sufficient coating composition is applied to the substrate to provide a smooth, continuous film. Thus, for example, a suitable coat weight would be between about one and about ten pounds per ream (a ream being defined as 3300 square feet).

The amount of the secondary release agent that is employed will depend upon the ultimate release properties which are desired. However, as a minimum, the secondary release agent should be present in an amount sufficient to improve the release properties of the release composition as compared with said release composition omitting the secondary release agent. Suitable amounts of the secondary release agent include, for example, between about 1 and about 30 percent, preferably between about 2 and about 10 percent by weight of the dry, air-containing microcapsules.

In conventional release coatings, the silicone must be applied to the paper so as to form a smooth, continuous film over the sheet, thus requiring relatively high coat weights of such conventional silicone release agents. The release agent of the present invention requires a much lower amount of the secondary release agent, such as a silicone, since when used in combination with the air-containing microcapsules, the secondary release agent is much more efficiently utilized. Thus, the combination release agent of the present invention provides a smooth, continuous, release surface at a very low coat weight.

The air-containing microcapsular release agents may have an average particle diameter in any desired range. However, a preferred average particle diameter is below about 2 microns, and an especially preferred range is between about 0.25 and about 1 micron.

The preferred range of particle sizes for the air-containing microcapsular release agent can also provide excellent opacity to the substrate. Thus, even unbleached kraft paper may be coated with the release composition of the present invention and provide a highly opaque, white surface. Furthermore, the release paper of the present invention not only has a high opacity, but high brightness, gloss and good dimensional stability at low coat weight and cost. In addition, special coating equipment is not required, and the release coating compositions of the present invention may be coated onto the desired substrate employing conventional paper coating equipment.

The release properties of the present release coatings may be controlled and the desired properties provided by: (1) varying the amount of release agent; (2) varying the type of secondary release agent; (3) employing various microcapsular wall materials; and (4) adding the secondary release agent at different points in the process.

The microcapsular coatings have desirable release properties wherein only the primary release agent, i.e., the air-containing microcapsules, is present. However, it is especially preferred to incorporate a secondary release agent, as previously defined, in the release coating of the present invention.

Any suitable means of incorporating the secondary release agent in the release coating of the present invention may be employed. For example, the secondary release agent, e.g., a silicone-glycol copolymer, may be admixed with an aqueous solution of an emusifier, and a highly volatile oil material, e.g., mineral spirits, to form emulsion droplets having the desired particle size. Next, the desired polymeric material, e.g., urea-formaldehyde, polystyrene, or the like may then be added to the emulsion to encapsulate each emulsion droplet and provide oil-containing release agent precursors Finally, the resulting microcapsular release coating may be coated onto the desired substrate, e.g., paper, which is then dried in order to activate the oil-containing precursors in order to replace the core of the microcapsule with air.

Alternatively, the oil-containing primary release agent precursor dispersion may be admixed with one or more secondary release agents in order to form an aqueous release coating composition which may then be coated onto the desired substrate and dried to activate the microcapsules.

In short, the secondary release agent may be: (1) added to the emulsion prior to encapsulation; (2) added to a dispersion of preformed precursor microcapsules; (3) added to a dispersion of activated, air-containing microcapsular release agents; (4) added to the emulsion with the encapsulating agent, e.g., urea-formaldehyde; or (5) added in any combination of methods (1), (2), (3) and (4).

The production of air-containing microcapsules in this manner is described in detail in U.S. Pat. No. 3,585,149 to A. E. Vassiliades et al, and entitled "Microcapsular Opacifier System", the disclosure of which is hereby incorporated by reference.

Thus, a process for providing the precursor microcapsules may be described briefly as a simple admixing of at least four ingredients. These ingredients are:
 (A) a water-immiscible oily material;
 (B) an amphiphilic emulsifying agent;
 (C) at least one solution comprising a polymeric resin, said solution selected from the group consisting of:
  (1) solutions comprising a hydrophobic, thermoplastic resin as the solute, said resin not having appreciable solubility in the oily material, and a water-and-oil miscible organic liquid as the solvent, said thermoplastic resin being capable of being separated in solid particle form from solution upon dilution with water;
  (2) solutions comprising a partially condensed thermosetting resin as the solute and water as the solvent, said resin condensate being capable of being separated in solid particle form from solution upon dilution with water, and,
  (3) mixtures of (1) and (2); and,
 (D) water in a quantity sufficient to cause the separation of at least one of said polymeric resins from solution.

The sequence of said admixing must be such that encapsulation of the emulsion by at least one of the synthetic resins in the admixture by dilution and ultimate separation from solution in solid particle form about a nucleus of oil in water upon dilution with water occurs no sooner than simultaneously with the formation of the emulsion. In other words, dilution, which can be performed by the addition of water to the oil-emulsifier-resin solution admixture or by the addition of the resin solution to the water-oil-emulsifier admixture, must be the final operation of the process. Thus, in the first case, the emulsifying operation and the encapsulation operation can be considered to take place simultaneously, whereas, in the second case, the emulsion is already formed when it is admixed with the resin solution.

The water-immiscible oily material forms the core of the precursor microcapsules and is driven from the microcapsules and replaced by air upon activation. By "water-immiscible oily materials", as employed herein, is meant lipophilic materials which are preferably liquid, such as oils which will not mix with water and which can be driven through the porous walls of the particular precursor microcapsules employed. The discrete microcapsules of the present invention may be provided with low melting fats and waxes as the lipophilic material. However, oils are the preferred core material, since they do not require special temperature maintenance during the production of the microcapsules. Furthermore, oils are more easily volatilized and driven through the micropores of the walls of the microcapsules by the application of heat.

Among the materials that are preferably employed as lipophilic nucleus materials in the process of the present invention are: aliphatic hydrocarbons, for example, heptane, octane, decane or mixtures of such materials, for example, mineral spirits products and the like.

The preferred lipophilic material are those oils having a fairly high vapor pressure (high volatility), so that they can be completely and easily expelled through the micropores of the solid-walled microcapsules over a wide range of temperature, e.g., by the application of moderate amounts of heat, e.g., 0° to 180° C., preferably between about 30° to about 100° C. It is especially preferred to employ oils which can be driven from the microcapsules at temperatures conventionally employed in the drying of paper webs or paper coatings, e.g., about 85° C. Especially preferred oils for use in the present invention include mineral spirits, benzene, xylene, toluene, styrene, turpentine, and oils having a like volatility.

Thus, the precursor oil-containing microcapsules may be activated by coating the capsules on paper and heating the paper to drive the oil through the porous walls of the capsule and replace the oil with air. Alternatively, a dispersion of the capsules may be spray dried to provide air-containing microcapsules. The resulting dry powder may be dispersed in water and coated onto a suitable substrate. Thus, any suitable means of heating the precursor microcapsules may be employed in order to activate them and provide the primary release agents of the present invention.

The emulsifying agents which may be used in the formation of the microcapsules are "amphiphilic". That is, while the emulsifiers are generally preferentially soluble in one phase of the emulsion, they do possess an appreciable affinity for the other phase. It can be said, then, that an amphiphilic emulsifier gives oil a more hydrophilic nature than it had before, and conversely, gives water a more lipophilic nature. Exemplary of the amphiphilic emulsifying agents which can be used in the instant invention are: naturally-occurring, lyophilic colloids including gums, proteins and polysaccharides, such as, gum arabic, gum tragacanth, agar, gelatin, and starch; and synthetic materials such as, hydroxyethyl cellulose, methyl cellulose, polyvinyl alcohol, polyvinyl pyrrolidone, and copolymers of methyl vinyl ether and maleic anhydride.

The thermoplastic resins which may function as the encapsulating materials are of a hydrophobic nature. In other words, they should not be capable of dissolving readily in water. While it is true that all resins exhibit some, even though very small hydrophilic properties, those resins acceptable for use in this aspect of the invention must for the most part be hydrophobic, that is, more lipophilic than hydrophilic.

In general, the thermoplastic resins are macromolecular polymers, copolymers, block polymers, and the like. The preferred resins are those containing non-ionizable groups, since the extent to which a resin ionizes has an ultimate effect on the resin's hydrophilic-hydrophobic properties. Resins such as polyvinyl chloride and polystyrene are non-ionizable, and are, therefore, preferred. However, other resins which can be used are polvinyl acetate, vinyl chloride-vinylidene chloride copolymers, cellulose acetate and ethyl cellulose. Novolak resins which are linear, thermoplastic condensation products of phenol and formaldehyde, are also capable of being used in the present invention as the thermoplastic resin. The novolaks are permanently fusible and soluble as long as their molecular structure is linear.

The selection of solvents for the resin to be used will depend on the specific encapsulating thermoplastic resin and the oil employed. Furthermore, the solvent must be sufficiently miscible with water in order for the resin to be separated from its solution when the oil-resin mixture is admixed with water.

In general, the solvents which are preferable are organic and of low polarity. Tetrahydrofuran has been used successfully with all of the resins heretofore mentioned and is, therefore, preferred. Examples of other solvents which are suitable include dioxane, cyclohexanone, methyl tetrahydrofuran, methyl isobutyl ketone and acetone.

A small amount of stabilizer may be incorporated with the solution of the thermoplastic resin to increase the resin's stability towards heat, light and atmospheric oxygen. Examples of stabilizers which may be used include dibasic lead phosphite, dibasic lead stearate, tribasic lead sulfate monohydrate, dibutyltin maleate and others well known to the art. The use of such stabilizers is wholly conventional.

The partially condensed, thermosetting resins which may be used in various embodiments of this invention must also be of a hydrophobic nature in their solid, infusible state. These resins comprise that broad class of compositions defined as formaldehye condensation products and include condensation reaction products of formaldehye with phenols, such as, hydroxybenzene (phenol), m-cresol and 3,5-xylenol; carbamides, such as, urea; triazines, such as, melamine; amino and amido compounds, such as, aniline, p-toluenesulfonamide, ethyleneurea and guanidine; and the like. Under the influence of heat, these resins change irreversibly from a fusible and/or soluble material into an infusible and insoluble material.

The preferred formaldehyde condensation products employed in this invention are partially-condensed melamine-formaldehyde, phenol-formaldehyde and urea-formaldehyde resins. These partially condensed resins can be prepared easily according to conventional practices. For example, a urea-formaldehyde partial condensate or syrup, which was used in a number of the examples enumerated below, is prepared by refluxing 60 grams of urea in 184 milliliters of formalin (37% by weight formaldehyde) neutralized to a pH of 8 with sodium carbonate. The mole ratio of formaldehyde to urea in this reaction mixture is 2.3 to 1. The reaction continues for about 1 to 1½ hours at a temperature between 92° and 96° C. or until 1 volume of the condensate becomes turbid when diluted with 2 to 10 volumes of water. The condensate can be used immediately or can be stored for later use by adding a small amount, about 6 to 15 percent by weight, of methanol to the condensate. The methanol prevents any further rapid condensation of the resin solution upon standing and can be evaporated from the syrup either prior to or during the admixing operation. The resinous condensate or syrup, either with or without methanol, defines an aqueous solution of a partially-condensed, highly crosslinkable resin, said solution being capable of being diluted up to at least twice its volume before any appreciable separation of the resin from its solution occurs. After separation of the resin from its solution, the condensation reaction continues with time to effect additional cross-linking of the partially condensed materials. This additional condensation or cross-linking may be accelerated by the application of heat to the precipitated particles. Thus, microcapsules comprising walls of a thermosetting resin material become harder with the passage of time.

Any suitable means of providing the desired substrate with the present release coating composition may be employed. The release coating compositions of the present invention may be provided, for example, by a series of steps which include emulsifying a highly volatile oil in a starch emulsifying agent and water under agitation conditions until droplets having an average particle diameter of about 1 micron are obtained. Next, the resulting oil droplets are encapsulated by adding a thermosetting or thermoplastic resin as the encapsulating agent to the emulsion with continued agitation. A curing agent, additional secondary release agent, and/or a binder may be optionally added to the microcapsular dispersion of precursor oil-containing microcapsules. The resulting microcapsular dispersion may be coated onto the desired substrate, and the coating may be dried in order to activate the precursor microcapsules. In this manner, a release sheet is provided and a tacky, pressure sensitive adhesive may be brought into contact with the release coating.

The present invention is illustrated by the following examples of preferred embodiments thereof. It will be understood that these examples are included merely for purposes of illustration and are not intended to limit the scope of the invention unless otherwise specifically indicated. As employed herein, the term "ream" refers to a ream containing 3300 square feet, i.e., 500 sheets of 25 inch by 39 inch paper. All percentages are by weight unless otherwise specified.

EXAMPLE 1

Fifty grams of mineral spirits are emulsified with a mixture of 112.5 grams of 20 percent by weight of a benzylated starch emulsifier solution in water and 6 grams of a 28.6 percent by weight solution of a chromium complex of a stearic acid in isopropanol. The foregoing ingredients are emulsified in a Waring blender until the average particle size of the emulsion droplets is about 1 micron. Next, 10 grams of an aqueous B-stage urea-formaldehyde condensate (60.8 percent by weight solids) are slowly added to the emulsion with continued agitation.

A paper substrate is coated with the resulting microcapsular release coating and is dried at a temperature of about 170° C. for a period of time sufficient to drive the mineral spirits core material from the microcapsules and replace the oil with air. The resulting paper has excellent release properties and water resistance. The TAPPI opacity of the release paper is 92.5 percent points which is equivalent to a 21.0 unit increase over the opacity of the original uncoated paper. The release paper has a coat weight of only 4.6 pounds per ream.

EXAMPLE 2

The procedure of Example 1 is repeated with the exception that 4 grams of the chromium complex is mixed with the starch emulsifier (rather than 6 grams as in that example) is emulsified with 50 grams of mineral spirits.

Next, 10 grams of a B-stage urea-formaldehyde (on a dry basis) are added to encapsulate the emulsion droplets. The resulting microcapsules have an average particle diameter of about 1.0 micron and when coated onto bond paper have very good release properties, good opacity, adhesion and water resistance.

EXAMPLE 3

Three grams of the secondary release agent employed in Example 1 are mixed with 194 grams of a 19.3 percent by weight starch solution in water and are emulsified with 137.5 grams of a petroleum naphtha in a Waring blender.

The emulsification is continued until the average particle size of the emulsion droplets is about 1 micron in diameter. The pH of the emulsion is 3.4 and in order to adjust the emulsion to a neutral pH of 6.8, 3 milliliters of a 29 percent solution of ammonium hydroxide are added to the emulsion.

Next, 33.5 grams of aqueous urea-formaldehyde (56 percent by weight solids) are slowly added to the emulsion to form microcapsules. The resulting dispersion is coated on paper at a coat weight of 2.5 pounds per ream and dried to activate the capsules. The final release paper has good release properties, opacity, adhesion and water resistance as before.

EXAMPLE 4

Fifty grams of mineral spirits are emulsified with 112.5 grams of a 2 percent by weight solution of a starch emulsifier. An aqueous urea-formaldehyde solution containing 60.8 percent by weight solids in an amount of 37 grams is admixed with 12 grams of a nonionic polyethylene emulsion as the secondary release agent.

The resulting microcapsules have an average particle diameter of about 1.0 micron. As before, the microcapsular dispersion is coated onto bond paper and dried at about 85° C. to drive off the liquid core. A release paper having good release properties, and good auxiliary properties, i.e., opacity, adhesion and water resistance is thereby provided.

EXAMPLE 5

Fifty grams of mineral spirits are emulsified with a mixture of 112.5 grams of a 20 percent by weight starch solution in water in a Waring blender. After emulsion droplets have an average particle size of about 1 micron, 10 grams of an aqueous B-stage urea-formaldehyde condensate are slowly added to the emulsion with continued agitation. Next, 6 grams of an isopropanol solution of a chromium complex of stearic acid in an amount of 28.6 percent by weight are added to the microcapsular dispersion. The resulting dispersion is coated on paper and activated by drying to provide an excellent release paper.

The following example illustrates the addition of a secondary release agent to a previously activated microcapsular dispersion.

EXAMPLE 6

Seven hundred grams of mineral spirits are emulsified in 1,400 grams of a 20 percent starch solution in water and agitation is continued until the average particle diameter of the droplets is about 1 micron. A partially condensed B-stage urea-formaldehyde resin syrup (65 percent solids in water) is added to the emulsion with continued agitation in order to encapsulate the droplets. The resultant microcapsular suspension is spray-dried to remove both the aqueous continuous phase and the mineral spirits contained in the core of the microcapsules.

Thirty grams of the dry, activated, air-containing microcapsules are suspended in 70 grams of water and 62. grams of a 28.6 percent solution of stearato chromic chloride are added. The resulting release coating is applied to bond paper at a coat weight of 4.0 pounds per ream and yields a release paper having good release properties, opacity and water resistance.

EXAMPLE 7

One hundred twenty-eight grams of a 25 percent aqueous solution of polyvinyl alcohol (commercially available as Covol 971 from CPR) are placed in a Waring blender and 32 grams of a 50 percent solution of a silicone polyglycol copolymer (commercially available as F-11522 from Dow Corning) are added. Next, 64 grams of xylene are added under conditions of brisk agitation, and agitation is continued until the average particle size of the emulsion droplets is about 1 micron. Next, 87.4 grams of an 18.3 percent by weight solution of an aluminum complex of myristic acid in isopropanol (commercially available as Aluminum Complex 101 from DuPont) and 11.4 grams of melamine formaldehyde (70 percent solids in water) are added to the emulsion to provide a release composition.

A paper substrate is then coated with the resulting microcapsular release coating composition, and the paper is dried at a temperature of about 80° C. for about 5 minutes in order to drive the xylene core material from the microcapsules, and replace the liquid core with air.

The resulting paper has excellent release properties, water-resistance and opacity.

EXAMPLE 8

Fifty-six parts by weight of a high viscosity polyvinyl alcohol (commercially available as EP-130 from Denka) are dissolved into 644 parts by weight of water to provide a homogeneous solution. Next, 112 parts by weight of an aliphatic hydrocarbon oil having a boiling range of 160° to 180° C. are dispersed in the polyvinyl alcohol solution by emulsification.

Emulsification is continued until the oil droplets have an average diameter of about 0.5 micron. Next, 21 parts by weight of a solution containing 7 parts water and 14 parts of a modified melamine-formaldehyde resin are added to the emulsion at a temperature of 40° C. The emulsion is continuously agitated for a period of about 10 minutes, and then 7 parts by weight of a silicone-polyglycol copolymer are added with continued agitation until the secondary release agent is uniformly distributed throughout the emulsion.

The resulting release composition is applied to a paper substrate at a concentration of 4.5 pounds per 3,000 square feet of paper. The resulting release paper is dried for 30 minutes at a temperature of 60° C. to drive off the oil.

In order to test the release properties of the coated release paper, a commercial cellophane tape is coated with a rubber-based pressure-sensitive adhesive and is applied to the coated release paper. The resulting laminate has a release value of 20 grams per inch when tested on a Keil Tester.

A cellulose acetate tape coated with an acrylic pressure-sensitive adhesive is applied to a second sample of the release paper. The resulting laminate has a release value of 75 grams per inch when tested on the Keil Tester.

EXAMPLE 9

One hundred forty parts by weight of a monofunctionally-substituted starch (commercially available as Emulsicote 87 from Penich & Ford) are dispersed in 560 parts by weight of water at a temperature of 40° C. The resulting suspension is heated to a temperature of 80° C. with continuous stirring for a total time of 1 hour. Next, 140 parts by weight of an aliphatic hydrocarbon having a boiling point range of 160° to 180° C. are dispersed by emulsification in the starch solution which had been cooled to a temperature of 40° C.

The emulsification is continued until the size of the oil droplets reaches an average diameter of about 0.5 micron. Next, 67 parts by weight of a mixture containing 20 parts by weight water and 40 parts by weight of a modified melamine-formaldehyde resin are added to the emulsion with continued agitation. Finally, 18.9 parts by weight of a glycol polysiloxane are admixed with the microcapsular dispersion.

The resulting capsule-containing release composition is applied to a paper substrate to form a release paper at a concentration of 4.0 pounds per 300 square feet of paper. The coated paper is then dried for a period of 30 minutes at a temperature of 60° C. A cellophane tape having a rubber-based pressure-sensitive adhesive is applied to the release paper and tested on a Keil Tester. The resulting laminate has a release value of 12 grams per inch.

A cellulose acetate tape that is coated with an acrylic pressure-sensitive adhesive is applied to a second sample of the release paper and the release properties of the resulting laminate are tested on a Keil Tester. This laminate has a release value of 45 grams per inch.

The following examples illustrate the production of transfer coatings employing the release papers of the present invention.

EXAMPLE 10

A pressure-sensitive adhesive composition is provided which comprises 100 parts of a copolymer of isobutylene and isoprene that is tackified with 15 parts by weight of a terpene-phenolic resin and 15 parts of a phenolic curing resin dissolved to a 30 percent by weight solids concentration in a toluene and hexane solvent blend.

The pressure-sensitive adhesive is applied to the release coating surface of the release paper described in Example 8 above at a coating rate of 4-5 grams per 100 square inches, and is dried for a period of 5 minutes at a temperature of 170° C. The resulting laminate is passed with the adhesive side next to glass cloth through nip rolls at a pressure of 40-60 pounds per square inch. By removing the release liner from the glass cloth, the adhesive surface, which is bonded to the glass cloth, can be adhered to any clean surface. This procedure is usually referred to as an adhesive "transfer" technique.

EXAMPLE 11

A tacky pressure-sensitive adhesive is applied to the release coating surface that is described in Example 9, above, at a coating weight of 2.5 to 3.5 grams per 100 square inches. The adhesive is a copolymer of 50 parts vinyl acetate and 50 parts di(2 ethylhexyl)acrylate (40 percent solids) in a mixture of toluene and ethyl acetate solvents.

The resulting adhesive coated release liner is dried at a temperature of 210° F. for a period of 3 minutes, and is then passed with the adhesive side next to a label base paper stock through nip rolls at a pressure of 40-60 pounds per square inch. The release liner may be removed from the paper to expose the adhesive which is bonded to the label base paper stock, and the label may be adhered to any clean surface.

This invention has been described in considerable detail with particular reference to preferred embodiments, but it will be understood that variations and modifications can be effected within the spirit and scope of the invention as described in the appended claims.

What is claimed is:

1. An opaque release sheet which comprises a substrate having at least one surface coated with a release composition, said release composition comprising three separate ingredients, said first ingredient being a primary release agent consisting essentially of discrete, substantially spherical, air-containing microcapsules, said second ingredient being binder for adhering said microcapsules to said substrate, and said third ingredient being between about 1 and 30 percent by weight of said air-containing microcapsules on a dry basis of a secondary release agent, said secondary release agent improving the release properties of said release composition as compared with said release composition omitting said secondary release agent, said release sheet being capable of removal from a tacky surface when said coated surface is applied thereto without affecting the properties of said tacky surface or said surface coated with said release composition.

2. A release sheet according to claim 1 wherein said secondary release agent is a chromic complex of stearic acid.

3. A release sheet according to claim 1 wherein said secondary release agent is polyethylene.

4. A release sheet according to claim 1 wherein two sides of said substrate are coated with said release composition.

5. A release sheet according to claim 4 wherein said coatings have different release values.

6. A release sheet according to claim 1 wherein said air-containing microcapsules have an average particle diameter below about 2 microns.

7. The release sheet of claim 1 wherein said substrate is paper.

8. The release sheet of claim 1 wherein said secondary release agent is a poly(organosiloxane).

9. A method for the production of a highly opaque release sheet, which comprises coating a substrate with an aqueous release composition comprising three separate ingredients, said first ingredient being a primary release agent consisting essentially of discrete, substantially spherical, air-containing microcapsules, said second ingredient being binder for adhering said microcapsules to said sheet, and said third ingredient being between about 1 and about 30 percent by weight of said air-containing microcapsules on a dry basis of a secondary release agent, said secondary release agent improving the release properties of said release composition as compared with said release composition omitting said secondary release agent.

10. An opaque release sheet which comprises a substrate having at least one surface coated with a release composition, said release composition comprising a primary release agent consisting essentially of discrete, substantially spherical, air-containing microcapsules and an effective amount of a secondary release agent, said secondary release agent being a member selected from the group consisting of polyethylene, a methoxysilane, a silicone-polyglycol copolymer and a Werner complex of a fatty acid.

11. A release sheet according to claim 10 wherein said secondary release agent is a silicone-poly-glycol copolymer.

12. A release sheet according to claim 11 wherein said substrate is paper.

13. A release sheet according to claim 11 wherein said microcapsules have walls comprising methylcellulose, polyvinyl alcohol, benzylated starch, urea-formaldehyde or melamine-formaldehyde.

14. A release sheet according to claim 13 wherein said microcapsules have walls comprising urea-formaldehyde.

15. A release sheet according to claim 13 wherein said microcapsules have walls comprising benzylated starch.

16. A release sheet according to claim 11 wherein said secondary release agent is present in an amount of between about 1 and about 30 percent by weight of said air-containing microcapsules on a dry basis.

17. An opaque release sheet which comprises a paper substrate having at least one surface coated with a release composition, said release composition comprising a primary release agent consisting essentially of discrete, substantially spherical, air-containing microcapsules and a secondary release agent in an amount of between about 1 and about 30% by weight of said air-containing microcapsules on a dry basis, said secondary release agent being a member selected from the group consisting of polyethylene, a methoxysilane, a silicone-polyglycol copolymer and a Werner complex of a fatty acid, said microcapsules having walls comprising methylcellulose, polyvinyl alcohol, benzylated starch, urea-formaldehyde or melamineformaldehyde.

18. An opaque release sheet according to claim 17 wherein said secondary release agent is a silicone-polyglycol copolymer.

19. A release sheet according to claim 17 wherein said microcapsules have walls comprising polyvinyl alcohol.

20. A release sheet according to claim 17 wherein said secondary release agent is a methoxysilane.

21. A release sheet according to claim 17 wherein said microcapsules have walls comprising a benzylated starch.

22. A release sheet according to claim 17 wherein said microcapsules have walls comprising urea-formaldehyde.

* * * * *